United States Patent [19]
Walenty et al.

[11] Patent Number: 5,558,409
[45] Date of Patent: Sep. 24, 1996

[54] ELECTROHYDRAULIC BRAKING SYSTEM

[75] Inventors: Allen J. Walenty, Macomb; Kevin G. Leppek, Rochester Hills; Alexander Kade, Grosse Pointe Woods, all of Mich.

[73] Assignee: General Motors Corporation, Detroit, Mich.

[21] Appl. No.: 355,468

[22] Filed: Dec. 14, 1994

[51] Int. Cl.$^6$ .................................................. B60T 13/16
[52] U.S. Cl. ........................ 303/10; 303/155; 303/115.2; 303/113.4
[58] Field of Search ................................ 303/3, 10, 15, 303/11, 20, 155, 162, 115.2, 113.4

[56] References Cited

U.S. PATENT DOCUMENTS

| | | |
|---|---|---|
| 4,653,816 | 3/1987 | Lin . |
| 4,664,453 | 5/1987 | Kade et al. . |
| 4,750,124 | 6/1988 | Lin et al. . |
| 4,755,946 | 7/1988 | Lin . |
| 4,783,127 | 11/1988 | Kade et al. . |
| 4,941,553 | 7/1990 | Harrison ............................ 303/115.2 X |
| 5,112,116 | 5/1992 | Mikhaeil-Boules et al. . |
| 5,246,281 | 9/1993 | Keppek . |
| 5,246,283 | 9/1993 | Shaw et al. . |
| 5,249,848 | 10/1993 | Matsuto et al. ................... 303/115.2 X |
| 5,302,008 | 4/1994 | Miyake et al. .................... 303/115.2 X |
| 5,312,172 | 5/1994 | Takeuchi et al. ................. 303/115.2 X |
| 5,320,421 | 6/1994 | Kade et al. ........................... 303/115.2 |

*Primary Examiner*—Lee W. Young
*Attorney, Agent, or Firm*—Michael J. Bridges

[57] ABSTRACT

Electrohydraulic braking applied to a plurality of automotive vehicle braking channels operates to drive brake pressure modulator position toward a position corresponding to a braking input and corrected for channel to channel braking variations and vehicle deceleration error. A function for adapting the braking input to a position command is provided for each channel and is periodically adapted in accord with a difference between the channel's brake pressure modulator position error and a desired position error.

9 Claims, 4 Drawing Sheets

5,558,409

ELECTROHYDRAULIC BRAKING SYSTEM

FIELD OF THE INVENTION

The present invention relates to automotive braking control and, more particularly, to an automotive electrohydraulic braking system.

BACKGROUND OF THE INVENTION

Automotive vehicle electrohydraulic braking (EHB) systems in which electrohydraulic actuators are controlled to drive brake pressure toward a desired pressure are known. Known EHB systems may provide closed-loop brake pressure control in individual braking channels of an automotive vehicle by periodically calculating brake pressure error as a difference between a desired or commanded brake pressure and sensed brake pressure, and applying the brake pressure error to a control function designed to efficiently drive the error toward zero.

Expensive fluid pressure transducers are typically used to sense brake pressure for closed-loop EHB control. The pressure sensed by such transducers may not correspond closely to actual braking pressure, due to the many mechanical losses that may occur between the point of brake pressure application and the position of the transducer. Additionally, such transducers may operate over a substantially limited pressure range or with unacceptably granular resolution. Pressure transducer reliability may be unacceptable for many EHB applications. Accordingly, it would be desirable to provide for closed-loop EHB without dependence on hydraulic pressure transducers.

The independent brake channel control of conventional EHB systems may result in uneven brake pressure application between the braking channels of the vehicle due, for example, to variations in brake pad wear, brake line length, and the amount of air in brake lines. Braking controllability and smoothness, effectiveness, and durability may be reduced due to such uneven brake pressure application. Accordingly, it would be desirable to provide for EHB control in which uneven braking pressure between individual EHB channels is minimized.

SUMMARY OF THE INVENTION

The present invention provides the desirable features of brake pressure transducer elimination and braking channel pressure difference minimization through an EHB system responsive to brake actuator position and not to transduced brake fluid pressure and which controls each braking channel individually to compensate for channel-to-channel variations which may, for a single commanded position which is shared by all braking channels, result in brake pressure variations.

More specifically, a sensed braking command from a brake pedal is provided as a command input to each brake channel of the vehicle. Each channel converts the command into an EHB actuator position command by applying the command to a channel-specific transformation function. The transformation functions are established on a channel-by-channel basis to output an actuator position command that will yield a degree of braking pressure at the corresponding vehicle wheel that is consistent with the single sensed braking command. Channel-to-channel variations are thereby accounted for, wherein a single sensed braking command may yield varying actuator position commands between the braking channels so that even braking pressure may be applied at all of the braked vehicle wheels. The position command from each channel is combined with a sensed actual position of the EHB actuator of that channel to form a position error, which is applied to a position control function designed to controllably drive the error toward zero.

In a further aspect of this invention, the position error for each channel is combined with a channel-specific desired position error to form an error feedback signal. A channel-specific transformation function adjustment factor is derived from the error feedback signal. Each transformation function is updated when a corresponding adjustment factor becomes available. Adjustment to the transformation functions adapts the functions to yield position command values that, for a given input command, provide position error values that will more rapidly lead to the brake actuator command needed to drive the position error toward zero. A fully adjusted transformation function will significantly reduce the time required to properly position an EHB actuator upon detecting a change in the sensed braking command.

In yet a further aspect of this invention, transformation function adjustments are stored in memory and not applied to adapt the function until conditions are such that adjustment of the function may not be substantially perceptible to the vehicle operator. For example, the adjustment may not be applied until brake activity is completed, such as when the brake pedal is released and all EHB actuators are returned to initial positions.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
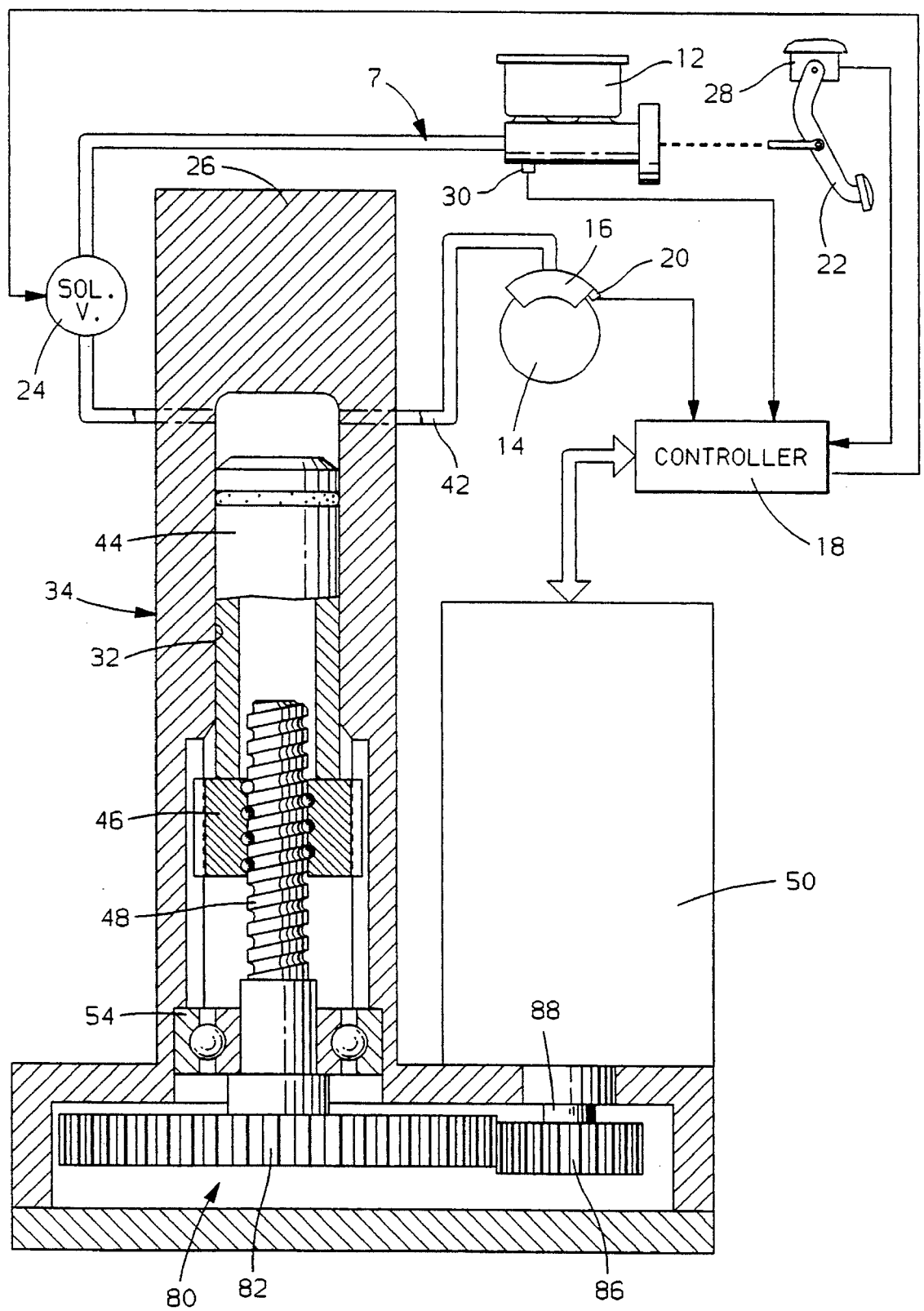
FIG. 1 is a hardware diagram of one channel of a multiple channel automotive vehicle electrohydraulic braking system.

An electrical hydraulic braking (EHB) system incorporating the principals of this invention is generally depicted in FIG. 1. Only a single braking channel of the EHB system of this embodiment is shown in FIG. 1 for simplicity. However, the overall EHB system applied to an automotive vehicle in accord with this embodiment comprises a plurality of EHB channels, such as one channel applied to control brake pressure at the front right vehicle wheel, one channel applied to control brake pressure at the front left vehicle wheel, and one channel applied to control brake pressure for both the rear vehicle wheels. Alternatively, an individual channel may be provided to control brake pressure at each of the two rear vehicle wheels in an alternative embodiment.

Referring to FIG. 1, the displacement of brake pedal 22 away from a rest position is transduced by conventional potentiometric position sensor 28 providing an output signal to brake controller 18 indicating such brake pedal displacement. The brake pedal displacement is mechanically applied to master cylinder 12 having a conventional pressure transducer 30 for transducing fluid pressure in the master cylinder relating proportionately to the pressure manually operating on the pedal 22. Pressure transducer 30 provides an output signal to controller 18 indicating such pressure. The master cylinder 12 develops brake fluid pressure in brake line 7 in relation to the force applied to an operator manipulated brake pedal 22, the line 7 passed through solenoid valve 24 which is controlled by controller 18 to open and close brake line 7 to brake line 40, such that when solenoid valve is open the brake line pressure from line 7 is passed to line 40 and through brake modulator 34 to brake line 42 so that such pressure may be applied to wheel brake 16 of one of the brake vehicle wheels 14.

The brake 16 is depicted as a disc brake caliper which develops braking force on the wheel rotor 14 in relation to the hydraulic pressure in the brake line 42. The wheel includes a wheel speed sensing assembly of conventional design 20 for transducing wheel speed and providing a periodic signal to controller 18 the frequency of which is proportional to the frequency of rotation of the wheel. The solenoid valve 24 is normally open and may be actuated to a closed position through a command issued by controller 18 to function as an isolation valve to prevent fluid communication between master cylinder 12 and wheel brake 16.

The brake pressure modulator 34 modulates brake pressure to a single brake channel. However such pressure modulator may be applied to more than one channel in alternative embodiments within the scope of this invention. Brake pressure modulator 34 of FIG. 1 includes a longitudinal bore 32 having a fluid connection with the brake line 42 for communicating brake fluid pressure to the line 42, and has a fluid connection with brake line 40 for communicating brake pressure from line 40 to the longitudinal bore 32. Piston 44 is slidably and sealably mounted within the longitudinal bore 32. Movement of the piston 44 provides a variable control volume in communication with the wheel brake 16, thereby modulating the pressure at the wheel brake 16. A nut 46 is operatively associated and connected with the piston 44 and the nut 46 is slidably mounted within the longitudinal bore 32 in a non-rotative fashion. A power screw 48 projects into the nut and is threadably engaged therewith in an efficient manner. The power screw 48 has a fixed rotational axis with respect to the modulator 34. Powering the power screw is a reversible DC brushless motor 50 which is actuated under the control of controller 18, as will be described. The power screw 48 is connected to a gear train 80 which is in turn mechanically associated with a rotor 88 of the motor 50. The power screw 48 is mounted by a bearing 54 and is connected to a large gear 82 at an end of the power screw. The first large gear 82 meshes with a small pinion gear 86. The pinion gear axially floats on the rotor 88 of the motor and is substantially retained in position relative to the rotor 88 by a spring clip (not shown). The power screw 48 along with the gear train 80 and the non-rotative nut 46 provide the means to reciprocally move the piston 44 within the longitudinal bore 32, and the motor 50 is torsionally connected via the gear train 80 to move the piston 44.

When the controller 18 energizes the motor 50 for rotation in a forward direction, the power screw 48 is rotated to extend the piston 44 further into the bore 32 reducing the control volume of the brake fluid therein, thereby increasing the brake pressure at line 42 and therefore at brake 16, increasing braking pressure. When the controller 18 energizes the motor 50 for rotation in the opposite, or reverse, direction, the power screw 48 rotates in the opposing direction to retract the piston 44 within the bore 32, increasing the control volume in the bore 32 and thereby reducing brake pressure at the line 42 and at the brake 16, reducing the braking pressure.

This electro-hydraulic braking operation is provided when solenoid valve 24 has been commanded to a closed position thereby closing the control volume to any fluctuations thereof that may be caused by variations in position of brake pedal 22. Upon occurrence of any fault condition or any condition under which operator manual braking control via a direct hydraulic link is preferred, controller 18 will open solenoid valve 24 providing for direct hydraulic control of brake pressure at the brake 16 by manual depression of brake pedal 22. The electro-hydraulic braking system of FIG. 1 is operative at all times while the brake pedal 22 is depressed and the system is "healthy." The piston 44 is initially positioned at vehicle startup in a fully retracted position in the bore 32.

The DC motor 50 takes the form of a brushless, electrically-commutated DC motor comprising a four-pole permanent magnet rotor and three stator windings (not shown). The motor 50 includes conventional position sensors in the form of hall effect sensors or equivalent sensors situated at a predetermined angular spacing and which are utilized in a standard commutation and control circuit (not shown) to control the switches in the full wave bridge of the power switch for commutating the phase windings of the motor.

Figure 3A:
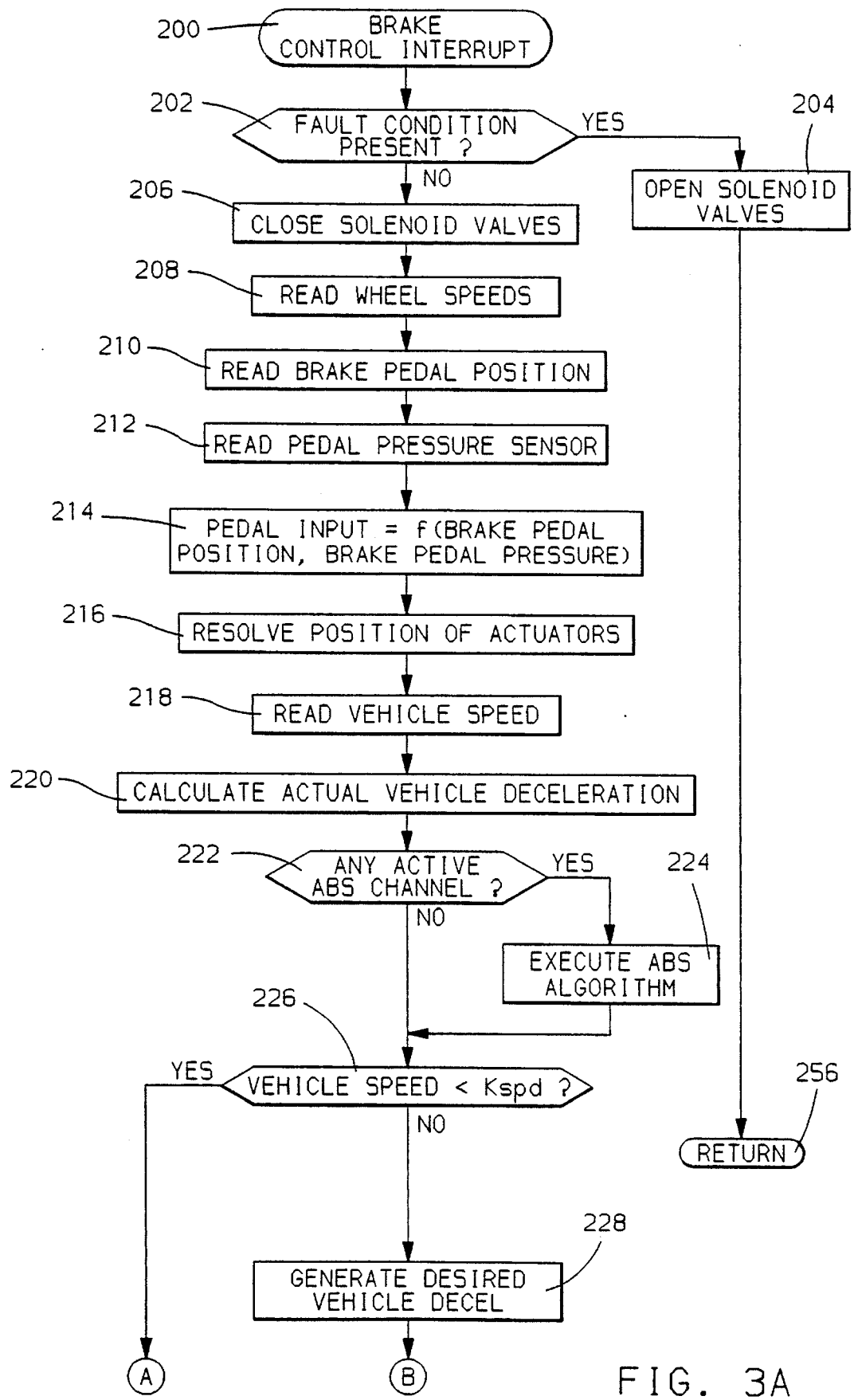
FIG. 3 illustrates a sequence of electrohydraulic brake control operations which are executed to carry out the function diagrammed in FIG. 2.
Figure 3B:
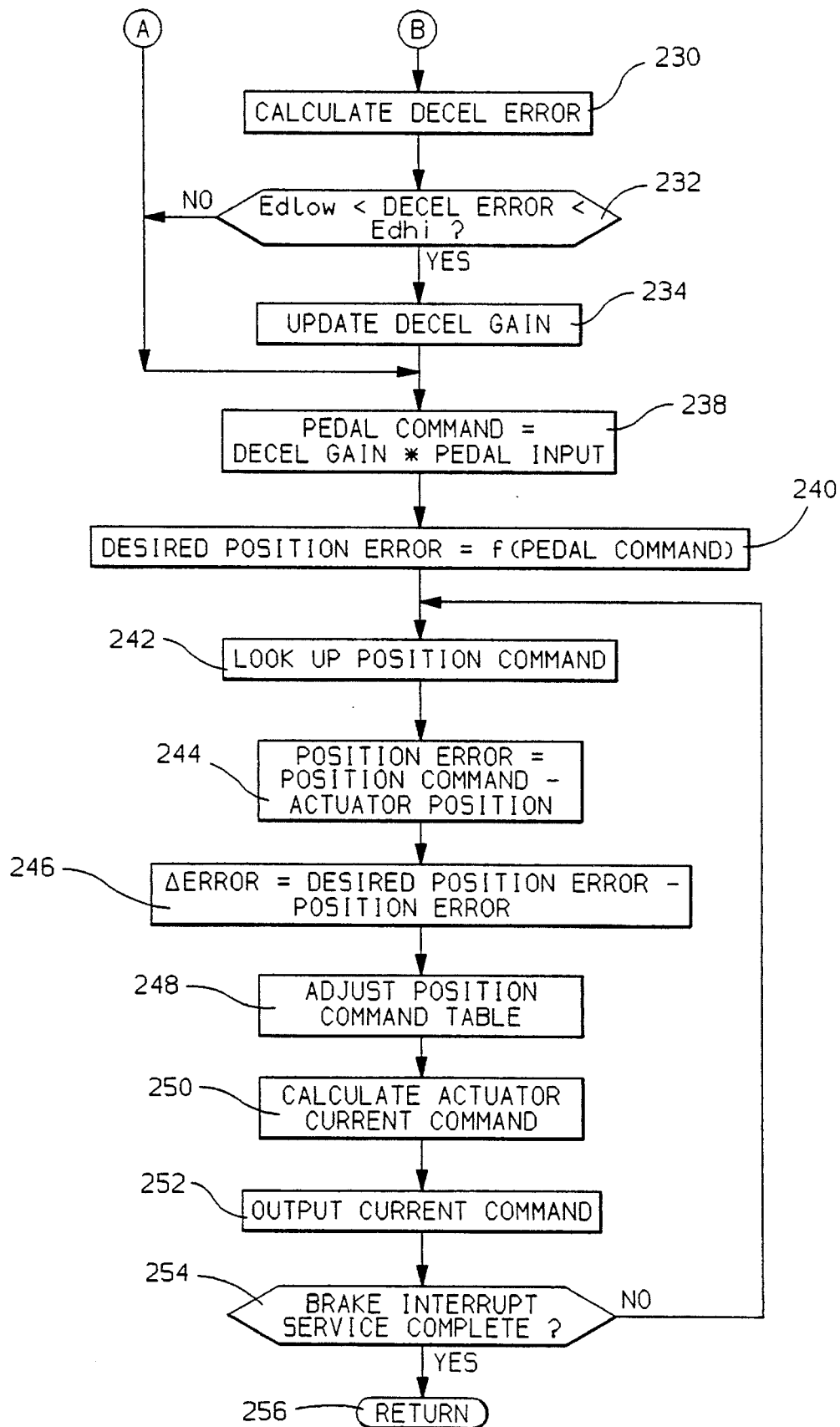

Controller 18 periodically outputs control commands for brake actuator positioning in accord with this embodiment. The control commands are determined through a closed-loop brake actuator position control loop implemented as a stored series of controller operations that are periodically executed in a step by step manner by controller 18. To provide actual actuator position information to the control, the longitudinal displacement of the piston, such as piston 44 within its respective longitudinal bore, such as bore 44, a rotor position encoder and relative position counter circuit is provided for counting position state changes corresponding to a predetermined angular displacement of the motor. The counter counts in a first direction, such as a down direction as the commutation sensors of the DC brushless motor 50 output commutation change information indicating that the rotor 88 is rotating in a direction retracting the position away from the fully extended position, and counts in the opposite direction such as an up direction when the rotor 48 is rotated in the direction extending the piston to the fully extended position corresponding to a minimum control volume of brake fluid in the longitudinal bore 32. In order to establish a known relationship between the counter and the position of the piston 44, the counter is preset to a predetermined count when the piston 44 is in a known position, such as a fully extended position or a fully retracted position. Thereafter, by incrementing and decrementing this count based on the state changes of the position sensors (not shown) of the motor 50 and the direction of rotation of the rotor 88, the counter tracks the position of the piston 44 relative to its known initial position. The specific operations for initializing the counter and for maintaining a count of the state changes in the motor position sensor when the rotor 88 is rotating in accord with this embodiment are as described in U.S. Pat. No. 5,320,421, assigned to the assignee of this application and hereby incorporated herein by reference. While such application is directed to automotive anti-lock braking, the portion of the description detailing the initialization of the counter and the maintaining and updating of the counter in accord with state changes in the position sensors of the DC brushless motor, as well as FIG. 3 of the incorporated reference and the text relating thereto for interpreting and maintaining count information and providing for such information, and the rehome routine of FIG. 5 and the text relating thereto are to be included for actuator position monitoring and indication in the EHB system of this embodiment.

Figure 2:
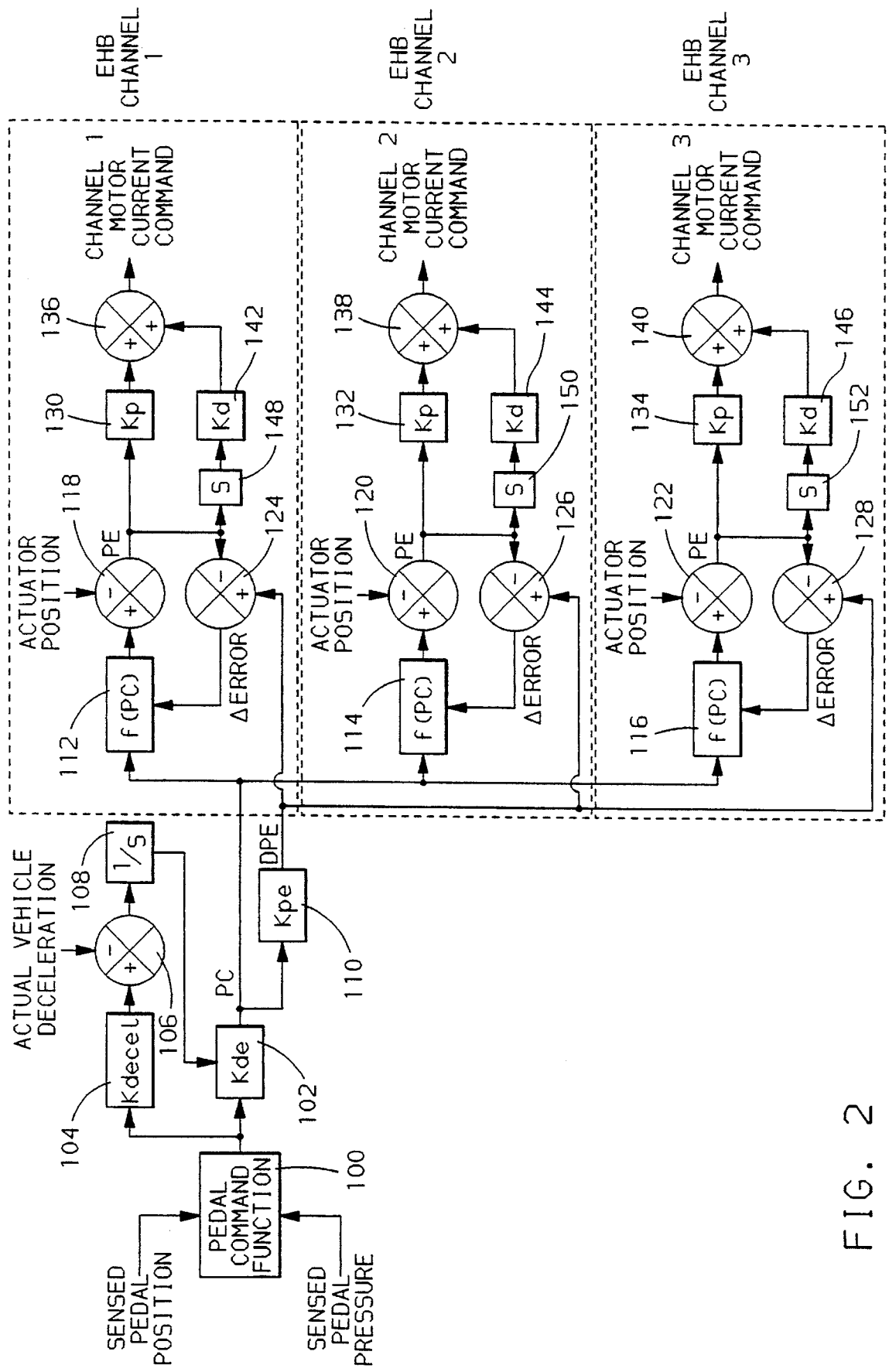
FIG. 2 diagrams a control function for controlling the multiple channel electrohydraulic braking system of the preferred embodiment.

Referring to FIG. 2, an actuator position control function is diagrammed to illustrate the control processes of this embodiment for outputting actuator current commands for controllably driving actuator position toward a desired position. In the present embodiment, three braking channels are controlled. The first braking channel, EHB channel 1, is applied to a first front vehicle wheel, a second braking channel, EHB channel 2, is applied to a second front vehicle wheel laterally opposing the first front vehicle wheel, and a third braking channel, EHB channel 3, is applied to the rear vehicle wheels.

An operator braking command is transduced into a sensed pedal position by sensor 28 of FIG. 1 and a sensed pedal pressure by pressure transducer 30 of FIG. 1. Such inputs are provided to pedal command function block 100 of FIG. 2 which applies the two inputs through a predetermined function to resolve the degree of operator requested braking. For example, sensed pedal position may provide precise, responsive feedback on even minor depressions or releases of the brake pedal in accord with minor manual variations in commanded braking. The information provided by the position sensor 28 is supplemented in this embodiment by position transducer information from transducer 30 (FIG. 1) which senses changes in pressure relating to changes in commanded braking from a vehicle operator over a broader range of pedal depression than the position sensor 28. Accordingly, when the position sensor 28 runs out of authority, such as when the pedal 22 is depressed to a position exceeding the position sensing range of the sensor, commanded braking information may still be indicated as sensed change in the brake fluid pressure in master cylinder 12 (FIG. 1). Through such a hybrid sensing approach, rapid and high resolution brake pedal depression sensing is provided under relatively small brake pedal depressions through sensed changes in pedal position with sensor 30. The high resolution position sensing may not extend over the entire range of possible brake pedal inputs. However, the pressure transducer 30 is available to sense more severe pedal depressions and to indicate such depressions. As the more severe depressions typically need not be sensed and indicated with relatively high resolution, the pressure transducer 30 adequately indicates brake commands under such conditions.

The two signals indicating braking command are provided to the pedal command function block 100 where they are resolved into a single brake command to which the control of EHB in accord with this embodiment is responsive. Closed-loop vehicle deceleration control is provided for EHB control enhancement in accord with this embodiment. A desired vehicle deceleration value is determined as a predetermined function of the resolved pedal command by passing the command through a gain block 104 having predetermined gain Kdecel. The desired deceleration is applied to summing node 106 at which it is combined with a sensed or calculated actual vehicle deceleration value to form a deceleration error value.

The actual deceleration value may be determined by calculating a change in vehicle speed over a predetermined time period. The deceleration error is next integrated via integrator 108 to form a pedal command gain Kde which is applied to the pedal command function output at block 102 to form pedal command PC which is applied to a closed-loop position control function for each EHB channel in accord with this embodiment.

Specifically, actuator position control for each of the three EHB channels of this embodiment is responsive to the single command PC, although the amount of actuator position needed by each channel to achieve the braking pressure corresponding to the command PC may vary from channel to channel. Actuator position is proportional to brake line pressure and therefore, by driving actuator position to a commanded actuator position, the desired brake pressure may be controllably driven to a preferred brake pressure and thus a desired degree of braking may be provided without use of motor current feedback information which tends to be noisy and difficult to process. The control function of FIG. 2 is thus a position-based control function for brake pressure control relying on the proportional relationship between piston position of a brake pressure modulator and brake pressure in the EHB system of the present embodiment.

To further enhance the position control, and especially the responsiveness of the control to a change in the pedal command PC, an additional control loop is provided for varying the commanded actuator position as a function of the pedal command PC in accord with a ΔERROR value generated as a difference between a desired position error DPE and an actual position error between commanded and actual actuator position. By adjusting the function for driving an actuator command from a pedal command in this manner, a more responsive actuator command to a change in pedal command may be provided for more rapid brake pressure control in response to a pedal command change. Specifically, the pedal command and a predetermined linear function of the pedal command DPE, which is a desired position determined by applying the pedal position command PC to a gain Kpe at a gain stage 110, are applied to each of the EHB control functions of FIG. 2. Accordingly then, each EHB control function is responsive to a single pedal command PC and to a single desired position error DPE. However, due to variations in brake wear and to such factors as variations in brake line compliance, hydraulic compliance, mechanical compliance and to other variations from channel to channel within the EHB system of an automotive vehicle, the actuator position that is generated responsive to the values PC and DPE may vary between channels. Such variations are compensated by the individual EHB channels of this embodiment by varying the relationship between the pedal command PC and the individual EHB actuator commands in accord with a difference DPE and actual position error for the corresponding channel, as will be further detailed.

Returning to FIG. 2, the pedal command PC is applied to a function at block 112 for generating a commanded actuator position. PC is also applied to functions 114 and 116 of brake channels 2 and 3, respectively, to generate commanded actuator position values. The function to which PC is applied at the blocks 112, 114, and 116 may vary from channel to channel of a vehicle and may be a nonlinear function calibrated to relate pedal command PC values to desired actuator positions to provide for vehicle braking performance consistent with conventionally understood control practices. The commanded actuator position is next applied to summing node 118 for channel 1, 120 for channel 2 and 122 for channel 3 to which is also applied a measure of actuator position. The actuator position is provided through the counting of the state changes in the position sensors (not shown) of the DC brushless actuators of this embodiment as described in detail in the reference incorporated herein. The actual actuator positions are subtracted from the commanded positions at the summing nodes 118, 120 and 122 to form position error PE values. The PE values are applied to a proportional-derivative control function including proportional gain Kp, at blocks 130, 132 and 134 of the three EHB channels and including the derivative function process of blocks 148, 150 and 152 and derivative gain Kd of blocks 142, 144 and 146. The products of the proportional gain applied to PE and the derivative gain applied to the derivative of PE are then summed at each of summing nodes 136, 138 and 140 to realize the motor current commands for each of the EHB channels. The motor current commands are applied to the DC brushless motor control circuitry to provide for the actuator positioning so that the proper brake pressure is applied to each of the channels of this embodiment.

Returning to summing nodes 118, 120, and 122, the position errors PE determined at such nodes are fed back to respective summing nodes 124, 126 and 128 to be subtracted from the desired position error DPE to form ΔERROR values for the three channels. ΔERROR represents a difference between the desired position error DPE generated by applying PC to the gain block 110 and an actual position error generated at the summing nodes 118, 120 and 122 for the three EHB channels. The ΔERROR values are applied as an adjustment for adapting the function of blocks 112, 114 and 116 of the 3 EHB channels to "learn in" the proper function value needed to provide an appropriate motor command to position the corresponding actuator rapidly to the position required to provide the proper braking in accord with the pedal command PC. This provides a more responsive brake pressure control and avoids a gradual adjustment of brake pressure in response to a change in PC. Further channel to channel differences may be accounted for by compensating the position command on a channel by channel basis as a function of corresponding actuator position.

When the functions of blocks 112, 114, 116 have been fully adjusted, wherein ΔERROR values have been applied repeatedly, if necessary, to the different function values corresponding to the range of PC values applied thereto, the commanded actuator positions yielded by the functions of blocks 112, 114 and 116 will provide for a position errors leading to motor current commands that provide highly responsive braking control in response to the PC.

To carry out the specific operations of controller 18 of FIG. 1 to provide for the control functions generally diagramed in FIG. 2, a series of instructions may be stored in controller memory for periodic execution while the controller is operating. For example, when a predetermined brake control interrupt is received, such as approximately every eight milliseconds while the brake pedal is depressed, an interrupt service routine will be executed to service the brake control interrupt and provide for the electrohydraulic braking for each of the channels of the present embodiment. Brake pedal depression may be sensed through a conventional pressure switch mounted on the pedal having a binary output which changes state when the pedal is depressed away from a rest position. As long as the pedal is depressed away from the rest position a periodic brake control interrupt may be generated, such as approximately every eight milliseconds, upon which interrupt controller operations will be vectored to a series of controller instructions generally illustrated by the operations of FIG. 3 starting at a step 200 and proceeding to a step 202 at which determination is made as to whether a fault condition is present in the EHB system of the present embodiment. A fault condition will be any condition diagnosed to indicate a degraded EHB operating condition such as any detected fault condition at any sensor or actuator or other device that may provide for reduced reliability of EHB operation. Such fault condition may be indicated by storing a flag in controller memory. If the fault condition flag is set as determined at the step 202, EHB operations will be suspended and the solenoid valve 24 of FIG. 1, which operates when closed to isolate the brake pressure modulator 34 from the master cylinder 12, will be opened to provide for manual vehicle braking. After opening the solenoid valve at the step 204, the routine proceeds to a step 256 to return to any prior controller operations that were ongoing at the time of the present brake control interrupt.

Returning to the step 202, if a fault condition is determined to not be present, the solenoid valve, such as the valve 24 of FIG. 1, is closed at a step 206 to provide for electrohydraulic braking control in accord with this embodiment. Wheel speeds are next read at a step 208 such as by reading the wheel speeds sensors, illustrated by sensor 20 of FIG. 1, for each of the vehicle wheels. The routine next proceeds to a step 210 to read the brake pedal position sensor value input to the controller 18 from the sensor 28 of FIG. 1 indicating the actual displacement of the brake pedal 22 (FIG. 1) away from a rest position. Brake pedal pressure sensor 30 input value is next read at a step 212 after which the routine proceeds to a step 214 to resolve a pedal input as a predetermined function of the brake pedal position and the brake pedal pressure. For example, the predetermined function to which the read pedal position and pedal pressure are applied at the step 214 may arrive at a brake pedal input value that is directly proportional to the brake pedal position for an initial range of brake pedal depressions to provide for accurate, high resolution brake command sensing for a range of brake pedal positions corresponding to lower brake pressure commands. When the brake pedal position sensor 28 runs out of authority, the brake pedal input resolved at the step 214 may be a predetermined function solely of brake pedal pressure as transduced by pressure transducer 30. In this manner, high resolution pedal input information is made available for small pedal input values while retaining sufficiently precise brake pedal input values for larger pedal input values.

After determining the brake pedal input at the step 214, present actuator position values of the electrohydraulic actuators of the three braking channels of this embodiment are resolved at a step 216, such as by referencing the present state change count values corresponding to the three DC brushless motors of this embodiment as described in the incorporated reference. After resolving actuator position values at the step 216, vehicle speed is read at a step 218, such as from conventional sensor information associated with the vehicle transmission output shaft or such as may be developed as a predetermined function of the individual wheel speeds as is generally understood in the art. The vehicle speed is used at a next step 220 to determine actual vehicle deceleration. In this embodiment, actual vehicle deceleration is determined as the time rate of change in vehicle speed over a recent few vehicle speed samples. An analysis is next made at a step 222 to determine if an antilock braking channel is active which may occur under conventional antilock braking when a significant wheel slip condition is present. An active ABS channel is indicated when an ABS flag stored in controller memory is set. If any ABS channel is determined to be active at the step 222, then the electrohydraulic braking control operations of the present interrupt service routine are temporarily suspended for the braking channel or channels in which ABS is currently active and conventional antilock braking control operations are carried out for such active channels as represented generally by the operation diagrammed at a next step 224. For example, such operations may iteratively provide for a reduction in braking pressure until a recovery from a determined wheel slip is detected and for iteratively increasing pressure upon detecting the recovery at a controlled rate so as to attempt to maintain maximum braking pressure without significant wheel slip in accord with general ABS control principals. The ABS control operations executed at the step 224 may correspond to any conventionally known ABS control operations using an electrohydraulic actuator for brake pressure modulation. After executing the ABS algorithm operations for the braking channels in which ABS is currently active at the step 224, or if no active ABS channels were detected at the step 222, at next step 226 is executed at which vehicle speed is compared to a constant speed value Kspd to determine if the vehicle is operating at a rapid enough rate that the wheel speed information generated at the step 208 can be assumed to be discernible. For the conventional variable reluctance wheel speed sensors of the present embodiment, the rate of rotation of the corresponding vehicle wheel must be greater than a predetermined rate that may be specified by the variable reluctance sensor manufacturer or the wheel speed information provided by the sensor may not be discernible by the EHB controller. If the vehicle is not travelling above the manufacturer's specified minimum speed, then the wheel speed information is assumed to not be sufficiently discernible to provide for EHB control operations in accord with this embodiment.

Specifically, vehicle speed is compared to Kspd, of about twelve miles per hour in this embodiment, at the step 226. If vehicle speed is greater than or equal to Kspd then discernible wheel speed sensor information is assumed to be available and the routine then proceeds to a step 228 to generate a desired vehicle deceleration value as a product of the pedal input resolved at the step 214 and a constant calibrated in accord with the preferred relationship between resolved brake pedal input and desired vehicle deceleration. Such relationship may, alternatively, be non-linear and may be represented as a conventional lookup table stored in controller memory. The table entries may be calibrated as the appropriate amount of vehicle deceleration for each of the range of pedal input values.

After generating desired vehicle deceleration, a deceleration error value is calculated at a step 230 has a difference between the desired vehicle deceleration and the actual vehicle deceleration determined at the step 220. The deceleration error is next compared at a step 232 to a deceleration range bounded by EDLOW at a low deceleration side and EDHI on a high deceleration side. In this embodiment, EDLOW is a value slightly less than zero deceleration error and EDHI is slightly greater than zero deceleration error, forming a deceleration error deadband within which a deceleration gain need not be updated to provide for closed-loop integral deceleration control. The deadband allows for a bypassing of the integration compensation around deceleration error in the event the error is substantially small, to avoid unnecessary yet potentially perceptible variations in the pedal command resulting from low level disturbances that may drive the deceleration error to a nonzero value and are not attributed to actual changes in either the desired deceleration or the actual deceleration of the vehicle. If the deceleration error is outside the deadband formed by EDLOW and EDHI at the step 232, then the deceleration gain is updated at a step 234 by adding to the deceleration gain the deceleration error determined at the step 230. Returning to the step 226, if the vehicle speed is less than KSPD, or if deceleration error was outside the deadband at the step 232, then the deceleration gain update is avoided by moving directly to a step 238. Step 238 is likewise executed after updating the deceleration gain at the step 234. A pedal command is determined at the next step 238 as a product of the deceleration gain which may have been updated at the step 234 and the pedal input resolved at the step 214. The pedal command thereby includes information not only on the actual brake pedal input but also on the degree of deviation of the vehicle deceleration away from a preferred deceleration for that pedal input so as to provide for proper vehicle deceleration control incorporated into the brake modulator position control of the present invention.

After resolving the pedal command at the step 238, a desired position error is calculated at a step 240 as a predetermined function of the pedal command, wherein the predetermined function may be a simple linear gain such as the gain Kde described at block 110 of FIG. 2. The gain should be selected as the gain providing a desired position that will yield an appropriate motor current command for the current pedal command resolved at the step 238, as described. After determining the desired position error at the step 240, steps 242–254 are executed for each EHB channel of the vehicle. The preceding steps 200–240 are only executed once for each brake control interrupt that occurs while the brake pedal is depressed away from its rest position. In accord with the control diagram of FIG. 2, certain operations are common to all EHB channels of the present vehicle braking system and others must be independent for each braking channel to accommodate variations in tolerances, brake wear, line length and actuator responsiveness etc. for each of the braking channels.

Specifically, for each EHB channel, a step 242 is executed at which a position command is referenced from a look-up table as a predetermined function of the pedal command PC generated at the step 238. The position command should be the desired brake actuator position needed to provide brake pressure properly corresponding to the pedal input and the desired deceleration determined via the respective steps 214 and 228. The look-up table used to determine the position command at the step 242 may evolve differently for the different EHB channels, due to the described channel to channel variations. Such table variations will compensate channel-specific variations, yielding a more balanced braking pressure between the multiple vehicle braking channels. After generating the position command at the step 242, a position error value is determined at a step 244 as a difference between the position command determined at the step 242 and the measured actuator position for the corresponding EHB channel, such as was determined at the step 216. A ΔERROR value is next determined at a step 246 as a difference between the desired position error determined at the step 240 and common to each of the EHB channels and the position error calculated at the step 244, which is channel-specific. Accordingly, the ΔERROR value incorporates actual actuator input information which may vary from channel to channel. The ΔERROR value is fed back and used, at a next step 248, to adjust the position command table from which the position command was referenced at the step 242. In the preferred embodiment, the position command referenced at the step 242 is determined by interpolating between pedal command values in the table to determine a corresponding position command. The position command table adjustment at the step 248 may be provided by increasing, by an amount of fifty percent of the ΔERROR value, each of the two position command table values between which the present position was referenced at the step 242. Subsequent table lookups will then benefit from the increased lookup values. Other approaches may be taken to adjusting the position command table so as to more rapidly provide an actuator current value responsive to the pedal input in accord with this invention. For example, in the event the position command is generated at the step 242 by applying the pedal command to a predetermined function, the function may be adjusted by adjusting function gains or offsets to accommodate the ΔERROR value or in the event interpolation is used, such as in the preferred embodiment, the approach to adjusting the interpolation values between which the position command was referenced may be provided through simple, heuristically-determined table value adjustments to provide for the proper adjustment to the position command table in accord with the principals of this invention.

While the position command tables for each of the EHB channels of this embodiment may initially set up with common position command values responsive to pedal command values, through the position command table adjustment provided at the step 248, which is responsive to actual position of the individual electrohydraulic actuators of each of the channels, the position command tables may vary significantly so as to provide compensation for variations in actuator performance, actuator wear, brake pad wear, brake line length or pressure etc., so as to provide for varying compensation for individual channels in accord with this invention. Braking pressure imbalances between the different channels of the vehicle are thus reduced, improving braking controllability, effectiveness, durability, and smoothness, as described.

After adjusting the position command table at the step 248, an actuator current command is calculated at a next step 250, such as by applying the position error generated at step 244 to a conventional control function such as a proportional-derivative control function including a proportional gain and a derivative gain predetermined to provide proper control responsiveness with minimum control overshoot in accord with preferred transient response characteristics of electrohydraulic braking control systems as are generally understood in the art. Specifically, in this embodiment the actuator current command Icmd for a given channel is generated as follows:

$$Icmd = Kp*Position\ error + Kd*d(Position\ Error)/dt.$$

The actuator current command is next output at a step 252 to the electrohydraulic actuator which, in this embodiment, is a DC brushless motor such as motor 50 of FIG. 1 to provide for proper positioning of the piston 44 in accord with the desired brake pressure. After outputting the current command at the step 252, a determination is made as to whether the brake interrupt service is complete at a next step 254. In this embodiment, brake interrupt service is complete at the step 254 if the control operations at the steps 242–252 have been executed for each of the EHB channels in which ABS is not currently active, for example including the front left and the front right channels and the single rear channel of the present embodiment. If the service is determined to be complete at the step 254, the described step 256 is executed to return to prior operations. Otherwise, the steps 242–254 are repeated for a next one of the EHB channels of the present embodiment.

The preferred embodiment for explaining this invention is not to be taken as limiting or restricting the invention since many modifications may be made through the exercise of ordinary skill in the art without departing from the scope of the invention.

The embodiments of the invention in which a property or privilege is claimed are descried as follows:

1. A brake control method for controlling the position of an actuator driven electrohydraulic brake pressure modulator for applying pressure to a brake of a vehicle wheel traveling over a road surface, comprising the steps of:

sensing a vehicle braking input;

providing a schedule of modulator position commands as a function of vehicle braking commands;

establishing a vehicle braking command in accord with the sensed vehicle braking input;

referencing a position command from the provided schedule corresponding to the established vehicle braking command;

estimating actual modulator position;

calculating position error as a difference between the referenced position command and estimated actual modulator position;

generating a drive signal as a predetermined function of the position error; and applying the drive signal to the actuator driven electrohydraulic brake pressure modulator.

2. The method of claim 1, further comprising the steps of:

generating a desired position error as a predetermined function of the established vehicle braking command;

calculating a difference between the desired position error and the calculated position error;

determining an adjustment value as a predetermined function of the calculated difference; and adjusting at least one of the schedule modulator position commands by the determined adjustment value.

3. The method of claim 2, further comprising the steps of:

sensing a substantially zero vehicle braking command; and upon sensing the substantially zero vehicle braking command, determining when the modulator has returned to a predetermined initial position, and wherein the adjusting step adjusts at least one of the schedule of modulator position commands by the determined adjustment value after the modulator is determined to have returned to the predetermined initial position.

4. The method of claim 1, further comprising the steps of:

estimating actual vehicle deceleration;

determining a desired vehicle deceleration as indicated by the established vehicle braking command;

calculating deceleration error as a difference between desired and actual vehicle deceleration; and adjusting the established vehicle braking command as a predetermined function of the deceleration error, and wherein the referencing step references a position command from the provided schedule corresponding to the adjusted established vehicle braking command.

5. The method of claim 2, further comprising the step of:

identifying at least one position command in the provided schedule having a command magnitude most closely corresponding to the magnitude of the referenced position command; and wherein the adjusting step adjusts the identified at least one position command by the determined adjustment value.

6. A method for controlling braking pressure in an automotive vehicle electrohydraulic braking system having a plurality of braking channels, each of the plurality having a motor driven brake pressure modulator for modulating braking pressure applied to at least one braked vehicle wheel traveling over a road surface, the method comprising the steps of:

sensing a vehicle braking input; determining a vehicle braking command as a predetermined function of the vehicle braking input; and for each of the plurality of braking channels, (a) storing a set of modulator position commands as a function of vehicle braking commands, (b) referencing a modulator position command from the stored set corresponding to the determined vehicle braking command, (c) estimating actual modulator position, (d) calculating actual modulator position error as a difference between the referenced modulator position command and the estimated actual modulator position, (e) generating a drive command as a predetermined function of the actual modulator position error, and (g) applying the generated drive command to the modulator to modulate brake pressure in the channel.

7. The method of claim 6, further comprising the steps of:

calculating a desired modulator position error as a predetermined function of the determined vehicle braking command;

for each of the plurality of braking channels:
   determining a difference between the desired and the actual modulator position error; and
   adjusting at least one of the stored set as a predetermined function of the determined difference.

8. The method of claim 7, further comprising, for each of the plurality of braking channels, the step of:

determining when braking activity in the channel is complete, and wherein the adjusting step adjusts at least one of the stored set as a predetermined function of the determined difference when braking activity in the channel is determined to be complete.

9. The method of claim 6, further comprising the steps of:

sensing vehicle deceleration;

generating a desired vehicle deceleration as a predetermined function of the determined vehicle braking command;

determining a difference between the desired and sensed vehicle deceleration; and adjusting the determined vehicle braking command as a predetermined function of the determined difference, and wherein, for each braking channel, the referencing step references a modulator position command from the stored set corresponding to the adjusted determined vehicle braking command.

* * * * *